(12) United States Patent
Johnson et al.

(10) Patent No.: US 6,435,010 B1
(45) Date of Patent: Aug. 20, 2002

(54) LEAK DETECTION SYSTEM

(76) Inventors: John Leslie Johnson, 4705 Highview Ct., Raleigh, NC (US) 27613; James G. Johnson, 502 E. Main St., Benson, NC (US) 27504

( * ) Notice: Subject to any disclaimer, the term of this patent is extended or adjusted under 35 U.S.C. 154(b) by 0 days.

(21) Appl. No.: 09/840,688

(22) Filed: Apr. 23, 2001

(51) Int. Cl.[7] .................................................. G01M 3/04
(52) U.S. Cl. ............................................ 73/40; 73/49.2
(58) Field of Search ............................. 73/40, 49.2, 37

(56) References Cited

U.S. PATENT DOCUMENTS

| | | | | |
|---|---|---|---|---|
| 2,522,927 A | * | 9/1950 | Camerota | 73/37 |
| 3,331,237 A | * | 7/1967 | Strang | 73/40 |
| 3,872,712 A | * | 3/1975 | Westervelt et al. | 73/40 |
| 4,587,619 A | * | 5/1986 | Converse, III et al. | 364/552 |
| 5,295,391 A | * | 3/1994 | Mastandrea et al. | 73/49.2 |
| 5,295,392 A | * | 3/1994 | Hensel et al. | 73/49.5 |
| 5,546,789 A | * | 8/1996 | Balke et al. | 73/40 |

* cited by examiner

*Primary Examiner*—Hezron Williams
*Assistant Examiner*—Charles D Garber
(74) *Attorney, Agent, or Firm*—Mills Law Firm PLLC

(57) ABSTRACT

A leak detection system includes a valve assembly having poppet valves disposed in a valve body for selectively closing internal ports for sequentially pressuring a test part from a pressure source, isolating the test part, determining the leakage conditions at the test part and exhausting the test part at completion of the test.

14 Claims, 12 Drawing Sheets

| OPERATION (FOR HIGH AND LOW PRESSURE LEAK TEST LINE) | HIGH PRESSURE POPPET (CONTROLLED BY A NORMALLY OPEN PILOT VALVE) | | LOW PRESSURE POPPET (CONTROLLED BY A NORMALLY OPEN PILOT VALVE) | | HIGH PRESSURE POPPET (CONTROLLED BY A NORMALLY OPEN PILOT VALVE) | | LOW PRESSURE POPPET (CONTROLLED BY A NORMALLY OPEN PILOT VALVE) | |
|---|---|---|---|---|---|---|---|---|
| | PILOT VALVE SOLENOID | POPPET POSITION | PILOT VALVE SOLENOID | POPPET POSITION | PILOT VALVE SOLENOID | POPPET POSITION | PILOT VALVE SOLENOID | POPPET POSITION |
| PRESSURE IN "HIGH" AND "LOW" INLET PORTS ONLY | OFF | CLOSED | OFF | CLOSED | OFF | CLOSED | OFF | CLOSED |
| SYSTEM CHARGED WITH HIGH PRESSURE | ON | OPEN | OFF | CLOSED | ON | CLOSED | OFF | OPEN |
| FLOW DIRECTED THROUGH FLOW SENSOR FOR LEAK DISPLAY | ON | OPEN | OFF | CLOSED | ON | CLOSED | ON | CLOSED |
| PRESSURE DUMPED FROM SYSTEM | OFF | CLOSED | OFF | CLOSED | OFF | OPEN | OFF | OPEN |
| SYSTEM CHARGED WITH LOW PRESSURE | OFF | CLOSED | ON | OPEN | ON | CLOSED | OFF | OPEN |
| FLOW DIRECTED THROUGH FLOW SENSOR FOR LEAK DISPLAY | OFF | CLOSED | ON | OPEN | ON | CLOSED | ON | CLOSED |
| PRESSURE DUMPED FROM SYSTEM | OFF | CLOSED | OFF | CLOSED | OFF | OPEN | OFF | OPEN |

FIG. 11

LEAK DETECTION SYSTEM

FIELD OF THE INVENTION

The present invention relates to equipment for use in testing leakage in pressure containing vessels or fluid lines, and, in particular, a control valve assembly with interface and microprocessor control for use in leak detection systems.

BACKGROUND OF THE INVENTION

Manufacturers of hydraulic, pneumatic, and containment equipment customarily test the fluid integrity of their components to ensure safe operation in the field. Standards are generally prescribed for leakage rates at test pressures and times correlated to the desired component specifications.

Currently, leak detection systems are an assembly of separate components housed in portable test units. Using a myriad of valves and pneumatic lines a component to be tested is attached to the test unit and independent valves are sequenced to route pressurized fluid, customarily air, to the component, which is then isolated. The leakage rate at the component is then measured and a part accepted or rejected based thereon. The multiple valves and lines may be integrated into a portable test stand for on-site testing. Nonetheless, the pneumatic system is expansive and cumbersome, with each element posing the potential for associated malfunction and leaks. Further, automation of a testing protocol is difficult because of the independent relationship of the components. Where varying test pressures are required for other components, the system must be retrofitted for each such use.

For example, the leak detection apparatus as disclosed in U.S. Pat. No. 5,898,105 to Owens references a manually operated systems wherein the testing procedures is controlled by plural manual valves and associated conduit occasioning the aforementioned problems and limitations.

Similarly, the hydrostatic testing apparatus as disclosed in U.S. Pat. No. 3,577,768 to Aprill provides a portable unit comprised of a plurality of independent valves and associated lines for conducting testing on equipment and fluid lines. The valves are manually sequenced for isolating test components from a single pressure source. U.S. Pat. No. 5,440,918 to Oster also discloses a testing apparatus wherein a plurality of conventional valving and measuring components are individually fluidly connected in portable Remotely controlled leak detection systems, such as disclosed in U.S. Pat. No. 5,557,965 to Fiechtner, have been proposed for monitoring underground liquid supplies. Such systems, however, also rely on an assembly of separate lines and valves. A similar system is disclosed in U.S. Pat. No. 5,046,519 to Stenstrom et al. US. Pat. No. 5,072,621 to Hassemann.

U.S. Pat. No. 5,540,083 to Sato et al. discloses remotely controlled electromagnetically operated valves for measuring leakage in vessels and parts. Separate valve and hydraulic lines are required.

In an effort to overcome the foregoing limitations, it would be desirable to provided a portable leakage detection system for testing the fluid integrity of fluid systems and components that includes integrated valving and porting within a compact envelope for automatically controlling a variable testing protocol. The leak detector includes a valve block having internal porting selectively controlled by four identical and unique pneumatic poppet valves for pressurizing the test part, isolating the test part for determining leakage rates with pressure and flow sensors communicating with the porting, and exhausting the test line upon completion of the leakage test. The poppet valves engage valve seats incorporated within the porting. The poppet valves are actuated by pilot valve pressure acting on a pilot piston to effect closure of the valve. The sensors interface with a microprocessor for comparing measurements with the test protocol and indicate pass or fail performance. Upon removal of the pilot valve pressure, the resident pressure in the porting shifts the valve to the open position. The leak detector includes plural inlets for accommodating variable pressure protocols. The leak detector thus eliminates the need for external fluid connections and conduits between the various detector components, eliminates the need for two-way valving actuation, and provides for connection with external test units with a single, easy to install, pneumatic line.

DESCRIPTION OF THE DRAWINGS

The above and other objects and advantages of the present invention will become apparent upon reading the following detailed description taken in conjunction with the accompanying drawings in which:

FIG. 11 is a truth table for the leak detection system; and

DETAILED DESCRIPTION OF THE PREFERRED EMBODIMENTS

Figure 1:
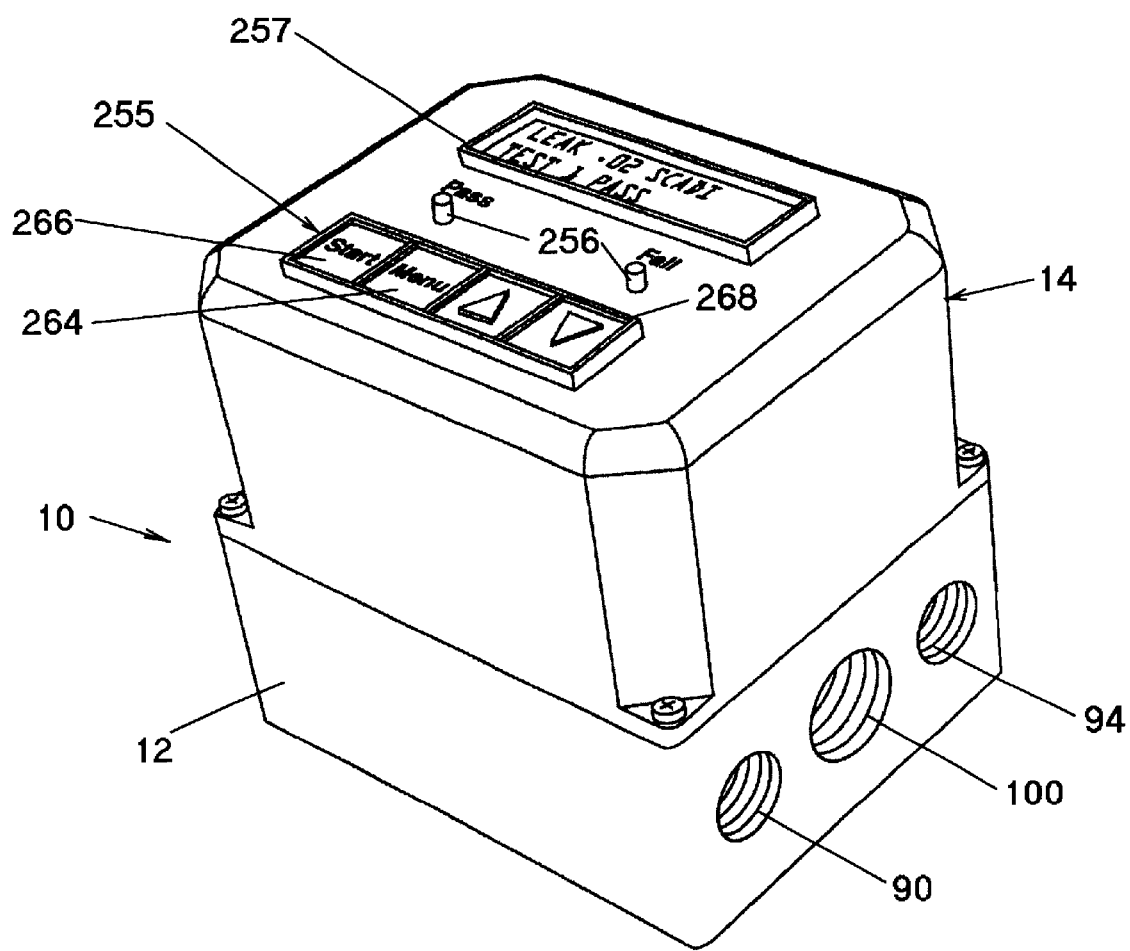
FIG. 1 is a perspective view of a leak detection valve assembly and control module in accordance with an embodiment of the invention.
Figure 2:
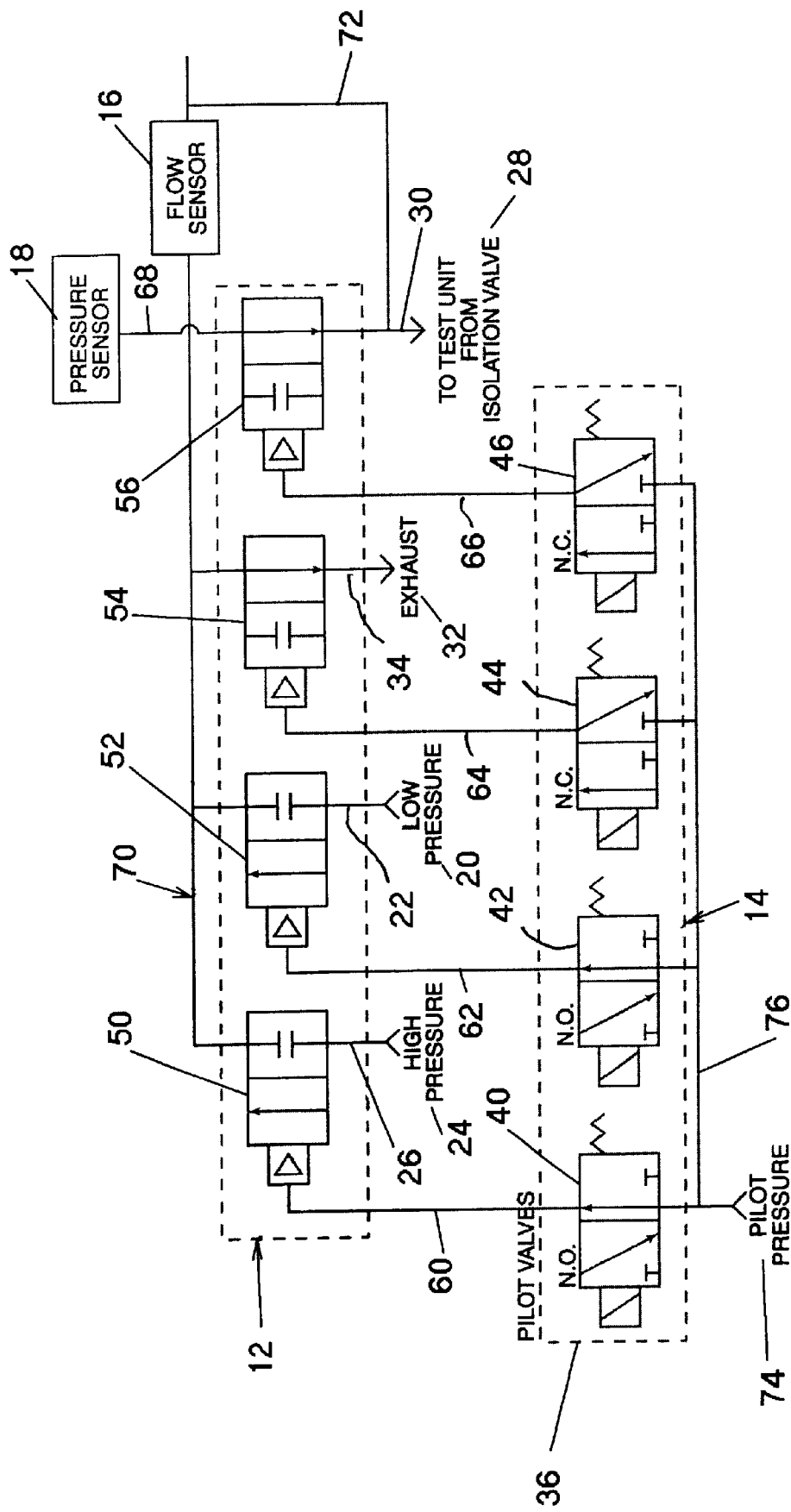
FIG. 2 is a schematic drawing of a leak detection system incorporating the valve assembly of FIG. 1.

Referring to the drawings for the purpose of describing the preferred embodiment and not for limiting same, FIGS. 1 and 2 illustrate a leak detection system 10 for determining the pressure integrity of components when subjected to pressure conditions during a test period. The leak detection system 10 comprises a valve assembly 12 and a control module 14 operatively coupled with a flow sensor 16 and pressure sensor 18. As hereinafter described in detail, the leak detector 10 is operative for testing the fluid integrity of test parts to determine is leakage standards are being achieved.

Figure 10:
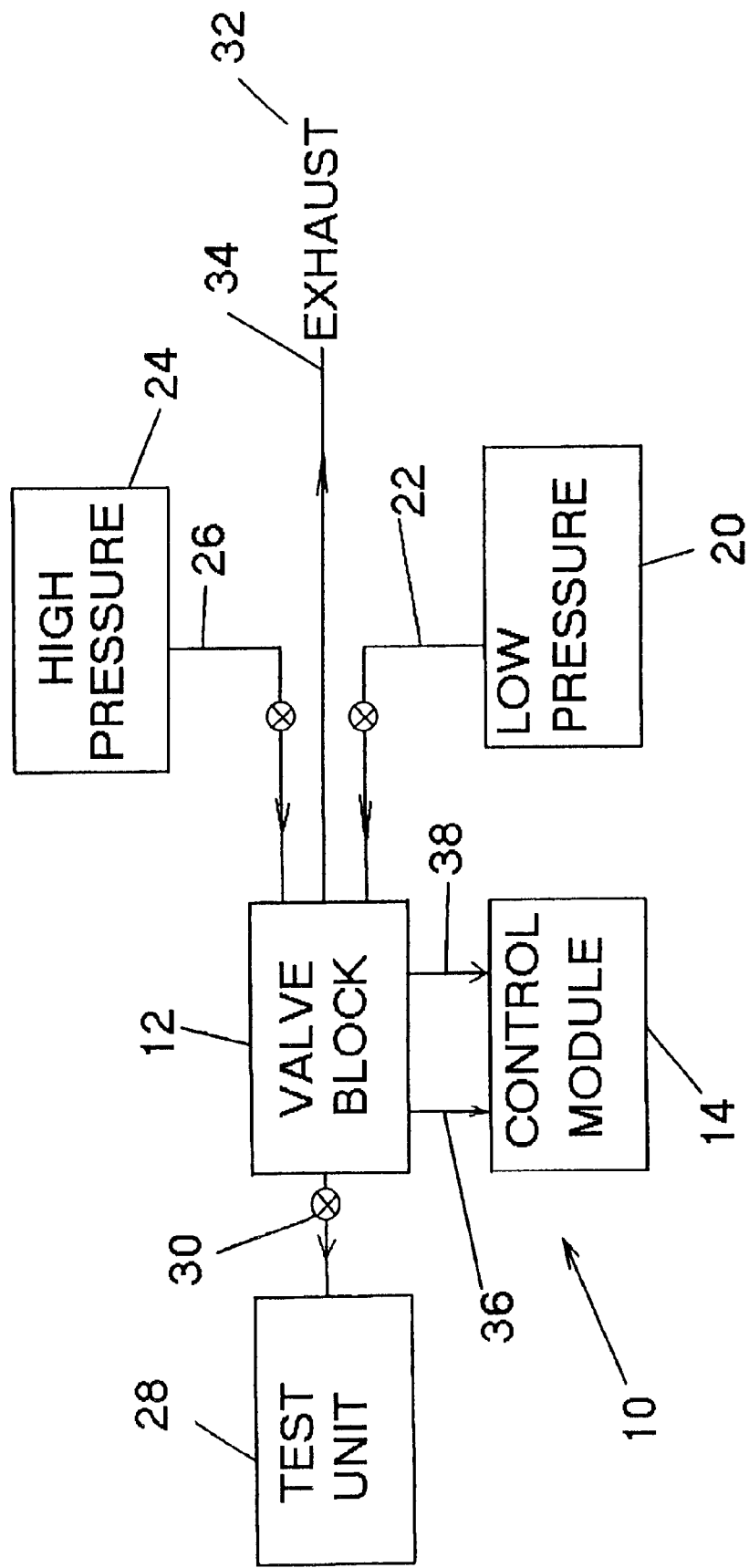
FIG. 10 is a schematic diagram of the leak detection system.

Referring additionally to FIG. 10, the valve assembly 12 is fluidly connected with a low pressure source 20 along line 22, a high pressure source 24 along line 26, a test unit 28 for testing such parts along line 30, and an exhaust 32 along line 34. Supplemental valves may be disposed in the lines for controlling flow therethrough.

The control module 14 comprises a pilot valve assembly 36 including pilot valves 40, 42, 44, and 46 fluidly connected with a high pressure valve unit 50, a low pressure valve unit 52, an exhaust valve unit 54 and an isolation valve unit 56 along lines 60, 62, 64 and 66, respectively. The pressure sensor 18 is coupled with the isolation valve unit 56 by line 68. The flow sensor 16 is connected with the valve units at manifold line 70 and with test part line 30 along line 72. The pilot valves are connected to pilot pressure 74 by manifold line 76. The lines and attendant fittings will vary in accordance with the parts undergoing testing and the test conditions.

Referring to FIGS. 3 through 8, the valve assembly 12 comprises a valve block 40 housing via ports to be described below a low pressure valve unit 80, a high pressure valve unit 82, an exhaust valve unit 84 and an isolation valve unit 86.

Figure 4:
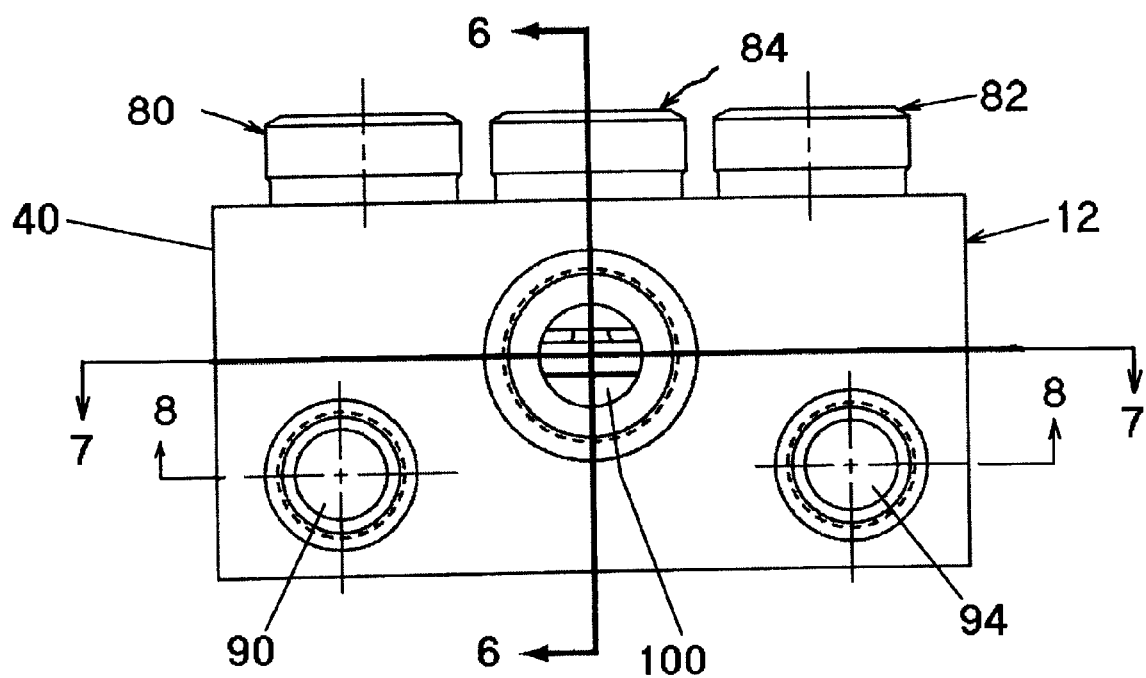
FIG. 4 is a front view of the valve assembly.
Figure 5:
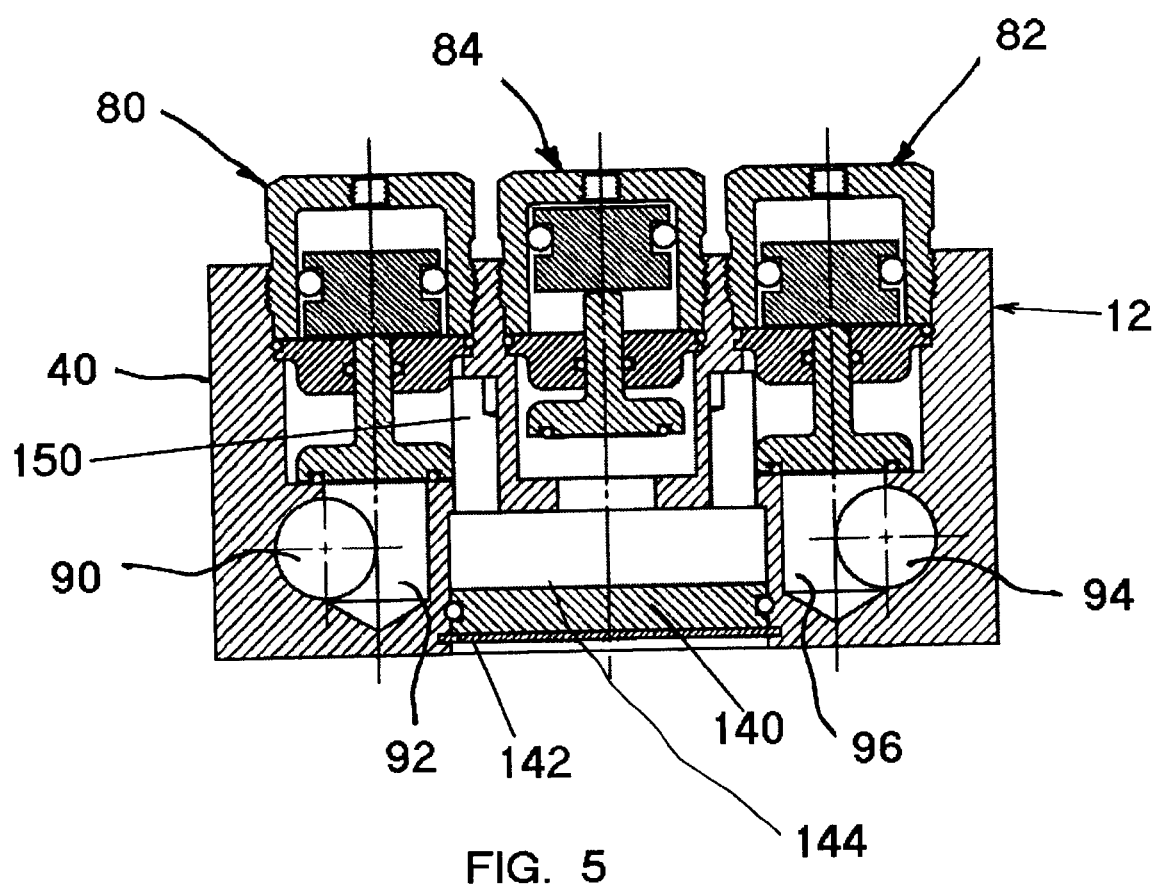
FIG. 5 is a vertical cross sectional view taken along line 5—5 in FIG. 3.
Figure 6:
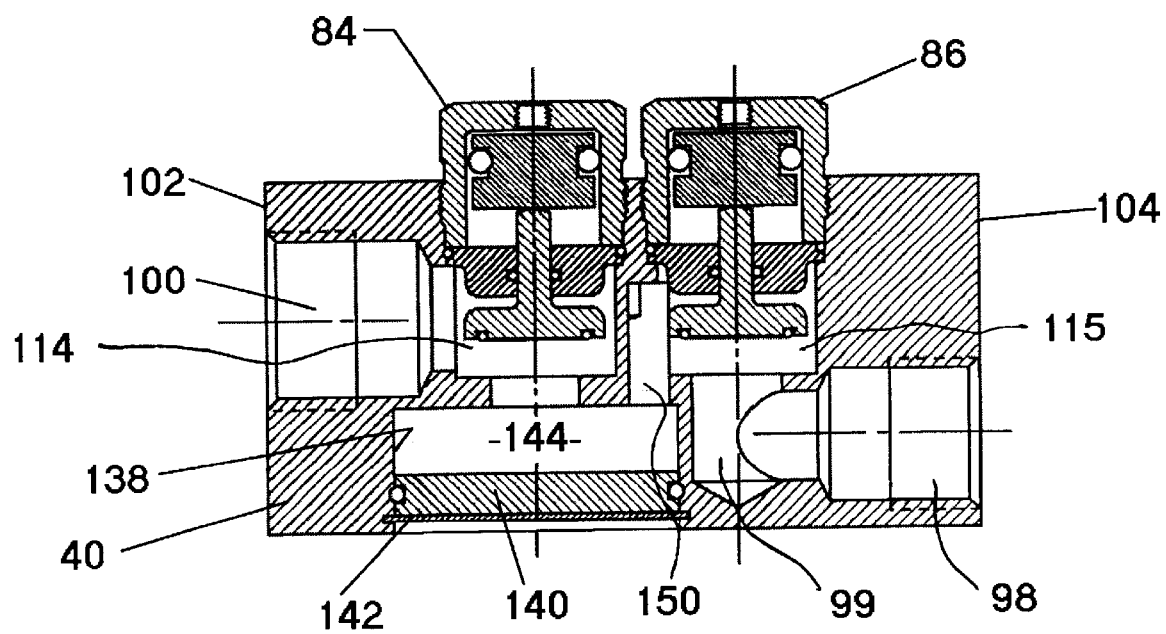
FIG. 6 is a vertical cross sectional view taken along line 6—6 in FIG. 4.
Figure 8:
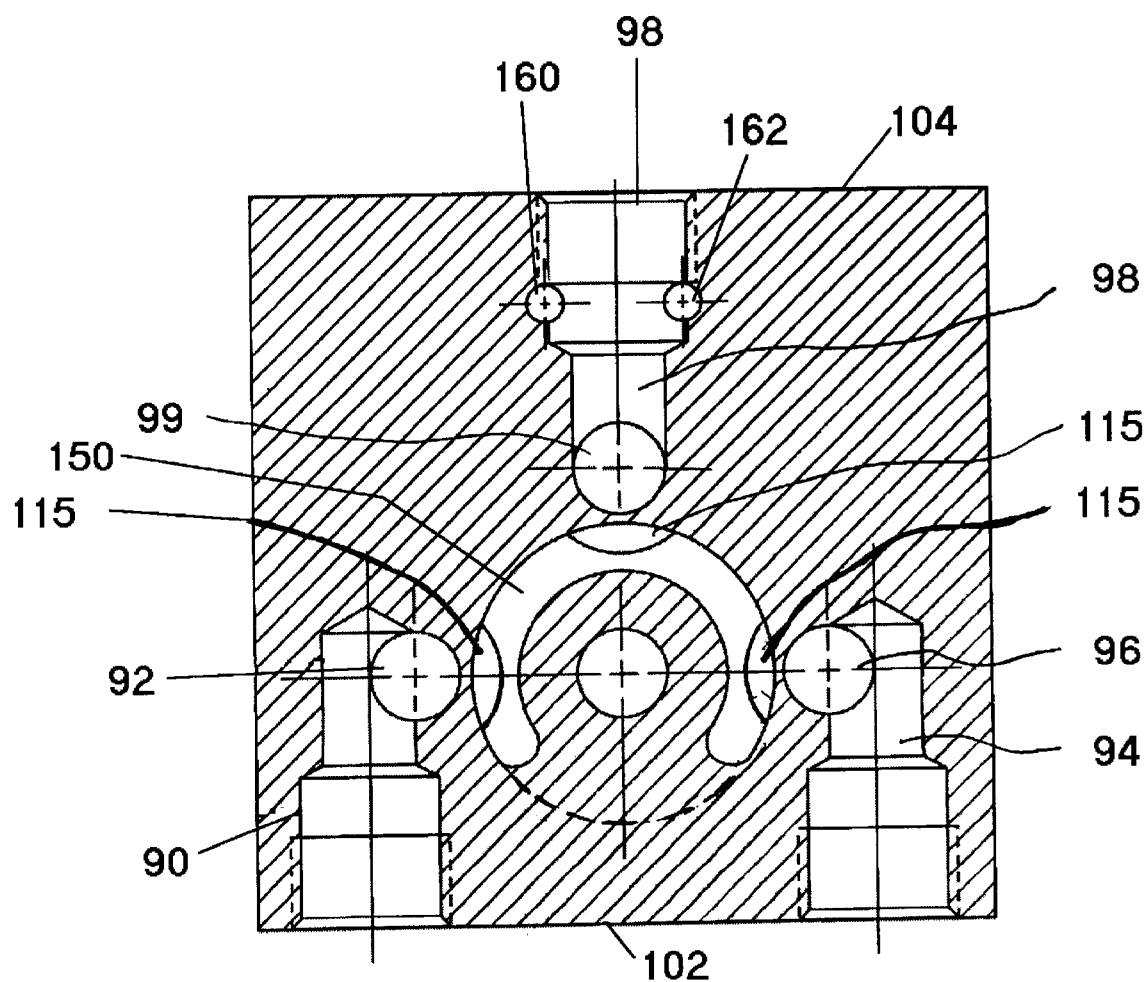
FIG. 8 is a horizontal cross sectional view taken along line 8—8 in FIG. 4.

As shown in FIGS. 5 and 8, the low pressure valve unit 80 is fluidly connected with line 26 and low pressure source 24 by a low pressure inlet port 90 intersecting with a vertical cross port 92. The high pressure valve unit 82 is fluidly connected with line 22 and high pressure source 20 by a high pressure inlet port 94 intersecting with a vertical cross port 96. As shown in FIG. 6, the isolation valve unit 86 is fluidly connected with the line 32 by exhaust port 98 and vertical port 99. The exhaust valve unit 84 is fluidly connected with line 30 by exhaust port 100. As shown in FIG. 4, the ports 90, 94 and 100 are disposed on the front face 102 of the valve block 12. The isolation port 98 is disposed on the rear face 104 of the valve block 12. The ports 100 and 98 are located laterally in a central vertical plane. The ports 90 and 94 are symmetrically disposed on opposite sides of the exhaust port 100 and therebelow. The ports 100, 94 and 90 lie in a common horizontal plane. Each of the ports is provided with an outer threaded bore for connection to the associated lines with an appropriate fitting for the fluid application.

Figure 9:
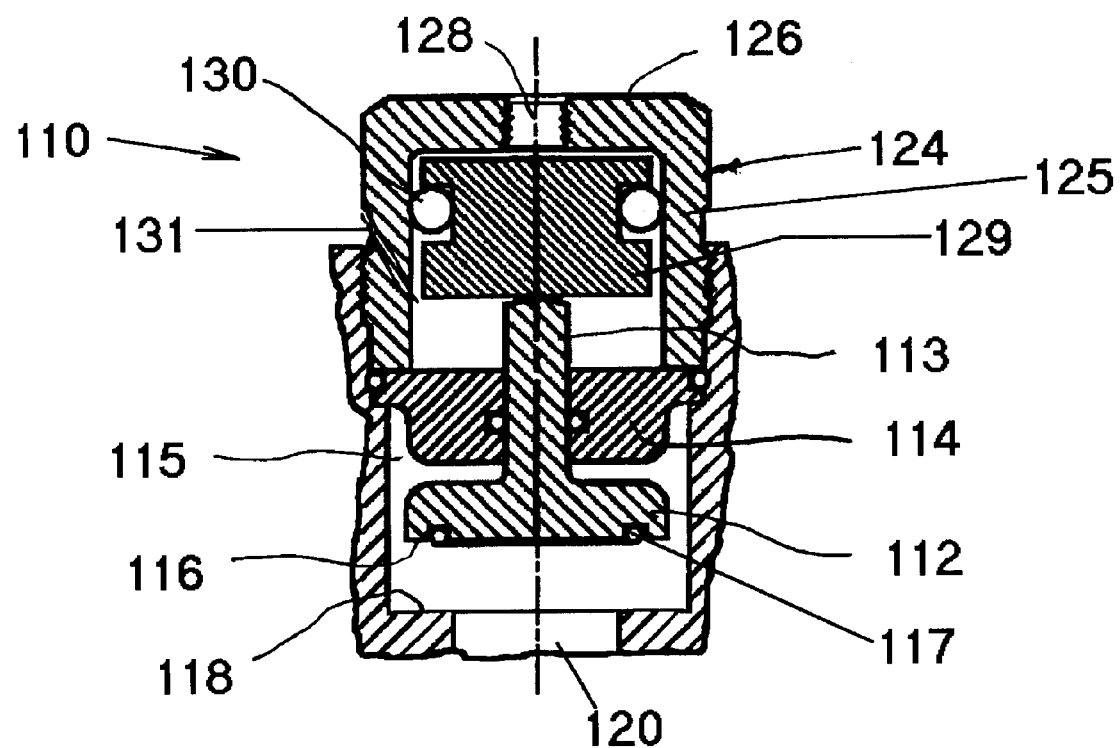
FIG. 9 is a fragmentary cross sectional view of a poppet valve assembly.

All of the valve units have a common architecture as representatively shown in FIG. 9. Therein, a valve unit 110 including a poppet 112 having a valve stem 113 supported by sealing disk 114 for reciprocation between a raised vent position as illustrated and a lowered sealed position in counterbore 115. The poppet 112 includes a cylindrical valve body 116 carrying O-ring 117 that engages the annular valve seat 118 of counterbore 115 formed coaxially with a vertical port 120. The outer rim of the sealing disk 114 is supported at the base of a secondary counterbore vertically above bore 115. The secondary counterbore outwardly terminates at an internally threaded end. A vent cap 124 includes a cylindrical sleeve 125 threadedly received in the threaded bore and a circular base 126 having a threaded center hole 128. An actuating piston 129 including O-ring 130 is axially slidably carried at the interior surface of the sleeve of the vent cap 124 for movement between a raised position engaging the base 128 and a lowered position engaging the top of the valve stem 113 for moving the poppet 112 to the sealed condition. Angularly disposed vent holes 131 are formed in the sleeve 125 for venting the piston. An air line connected with the pilot pressure line is connected at the center hole 128 for connection with the pilot pressure control system.

In typical operation, when pilot pressure is applied in the chamber above the piston 129, the piston 129 is forced downwardly thereby shifting the poppet 112 to the sealed position. When the pilot pressure is removed and the port 120 is pressurized, the poppet 112 and the piston 129 are driven to the raised, open position. Assist springs may be deployed, particularly in the isolation valve, for providing additional biasing to the open condition.

As shown in FIGS. 5 through 8, with respect to the exhaust port 100 and valve unit 84, a counterbore 138 is formed in the bottom surface of the valve block 40 coaxially therewith. A circular sealing blank 140 is retained at a step in the counterbore 138 by a split retaining ring 142 retained in a corresponding annular groove thus defining a pressure chamber 144. A C-shaped distribution channel or port 150 extends from the chamber 144 upwardly and intersects the counterbores 115 of valve units 110.

Figure 3:
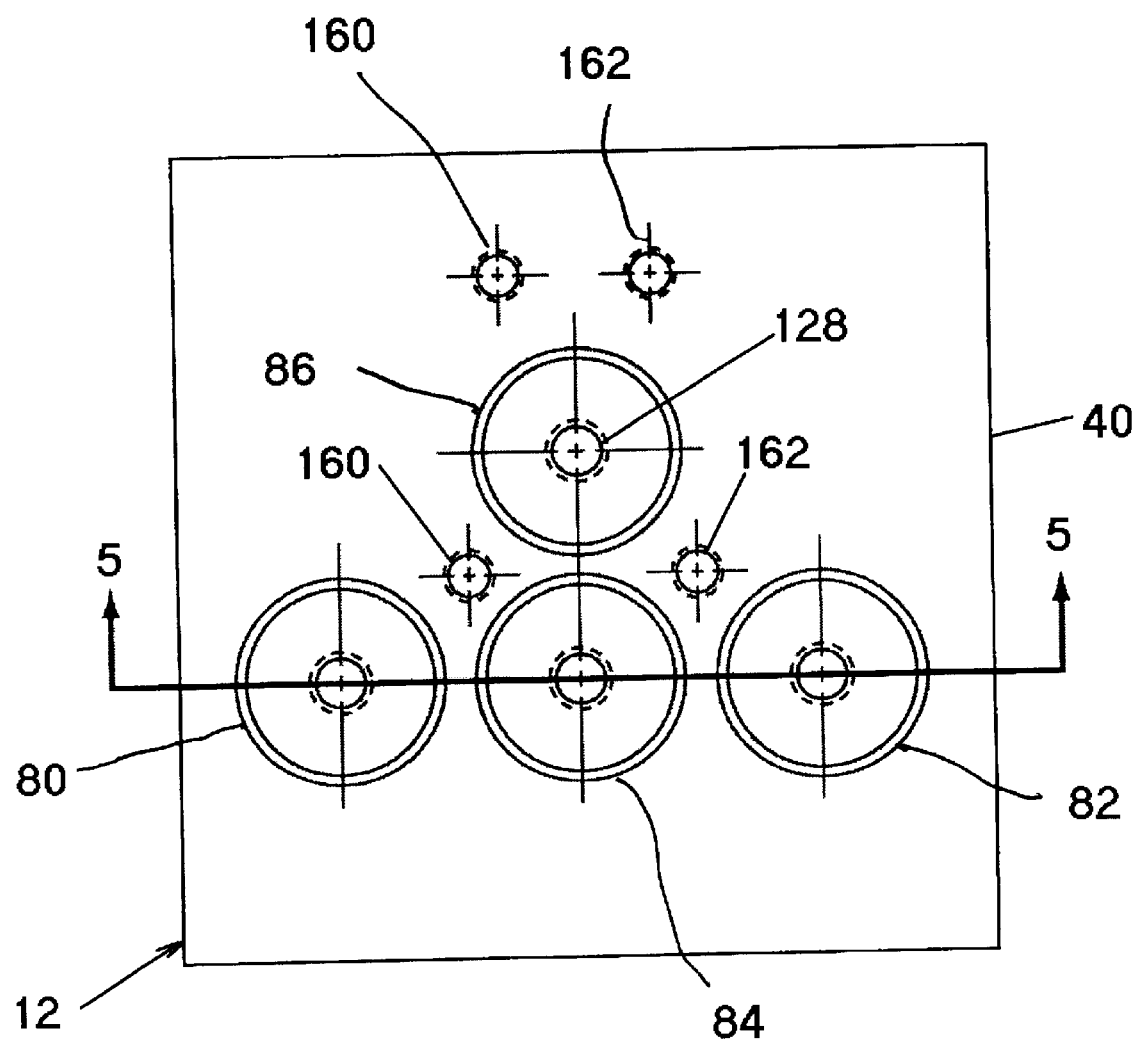
FIG. 3 is a top view of the valve assembly.
Figure 7:
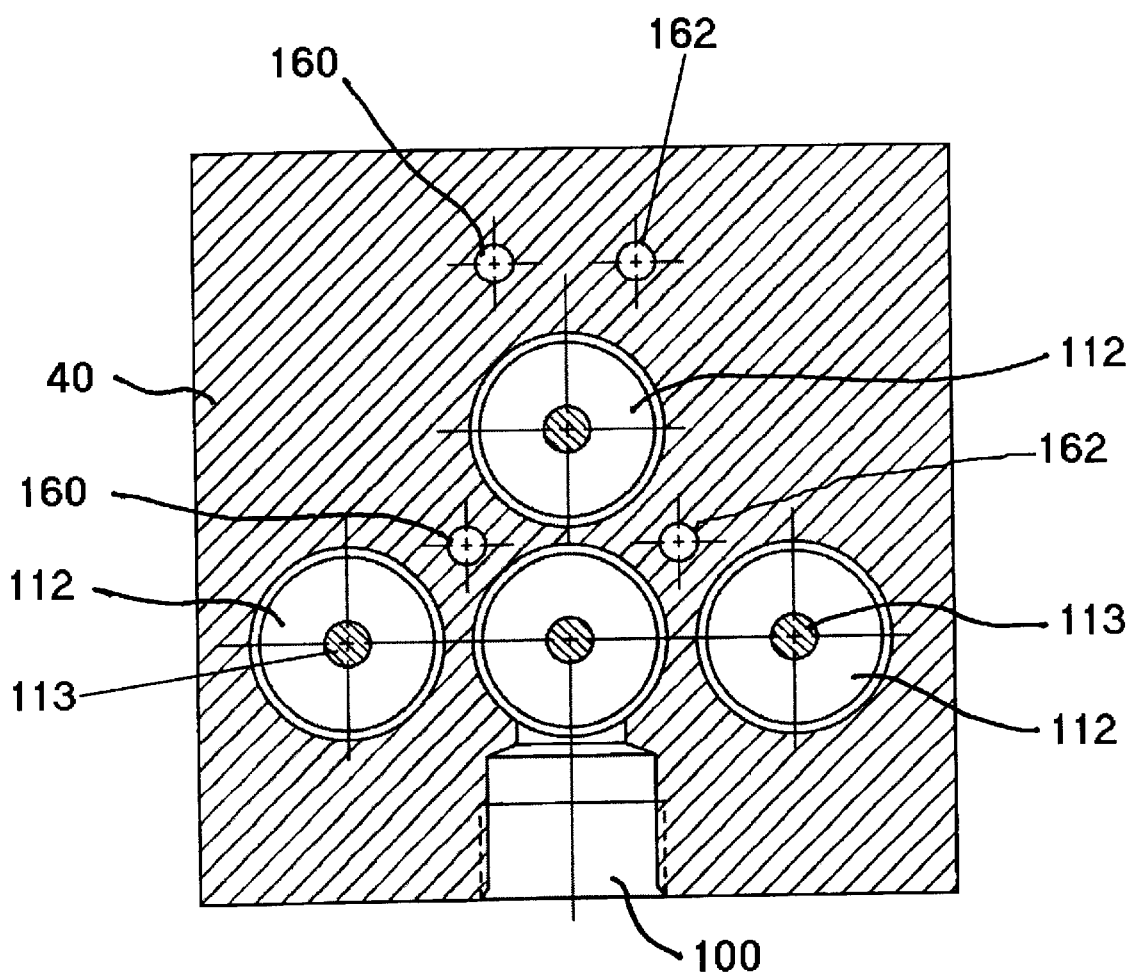
FIG. 7 is a horizontal cross sectional view taken along line 7—7 in FIG. 4.

Accordingly, when either of the pressure valve units is pressurized from its source and the pilot control to the piston is interrupted, the air flow in the ports 92, 96, 99 shifts the poppets to raised, open positions, thereby pressurizing the distribution port 150 and chamber 144 resulting in pressure communication therebetween. Referring to FIGS. 3, 7 and 8, a pair of vertical ports 160 communicate upstream of the isolation valve unit 84 for connecting one line of the flow sensor 16 and the pressure sensor 18. A pair of vertical ports 162 communicate on the other side of the isolation valve units 84 with the distribution port 150. Accordingly, the flow sensor 16 in a conventional manner measures pressure transients on the part under leakage test while the pressure sensor 18 measures pressure conditions on both sides of the isolation valve.

The valve unit is operationally connected to an independent test unit whereat parts to be leak tested may be deployed. The test protocol may specify a high pressure test for a defined test period or a low pressure test for a defined test period. Test parts are deemed successful if the leakage under pressure as determined by the flow sensor 16 is below a predetermined threshold. The control system 14 is effective for establishing the appropriate protocol.

Figure 12:
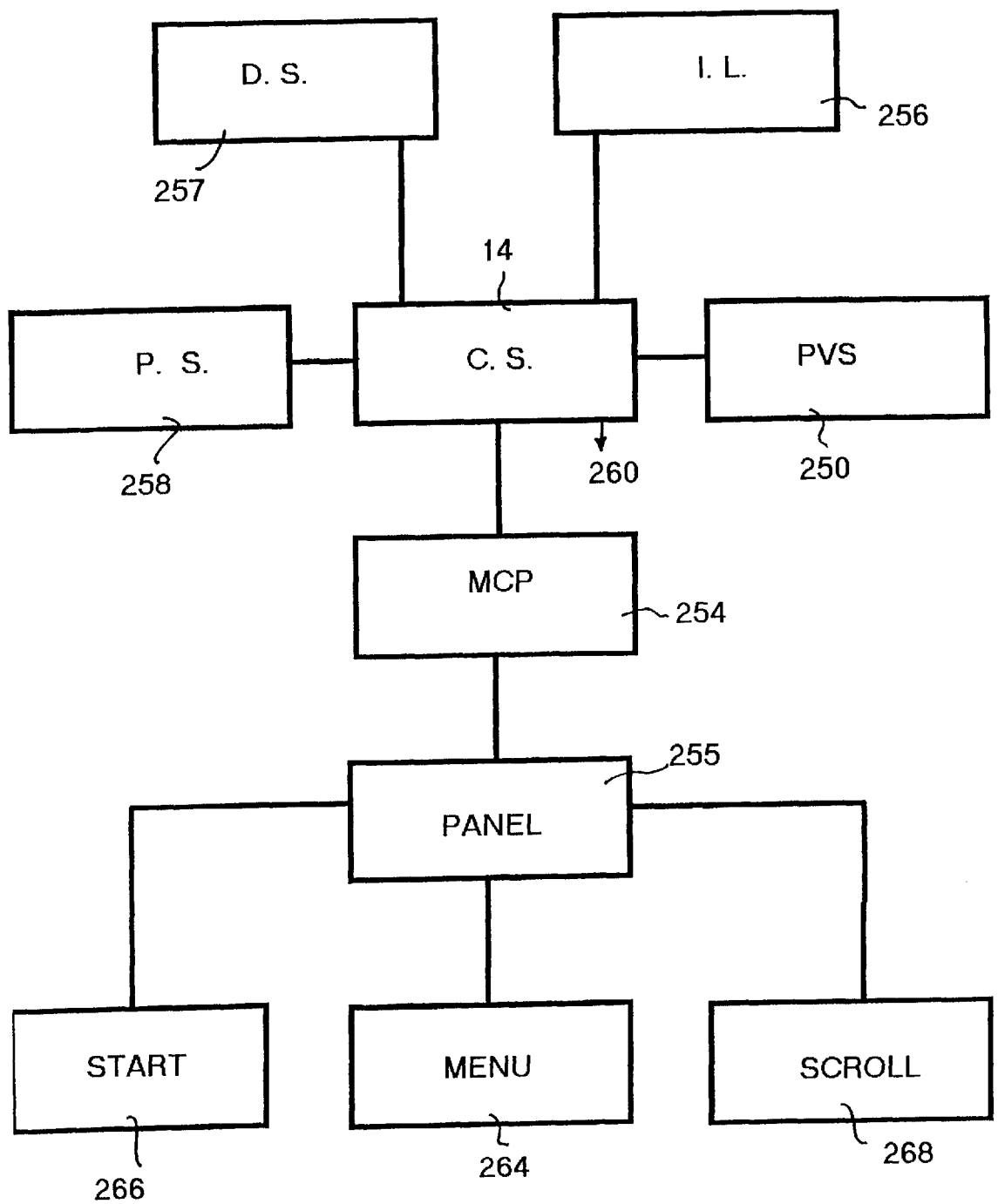
FIG. 12 is a schematic diagram for the control system for the leak detection system.

Referring to FIG. 12, the control system 14 comprises the pilot valve system 250, a microprocessor 254 coupled with a control panel 255 for defining and conducting the test protocol, test result indicator lights 256 a display screen 257, for denoting passing or failing of the test connected to a suitable power supply 258. The microprocessor 254 contains the protocols for the various parts, preferably programmed through an external computer port 260. The desired protocol is accessed at control panel 255 through menu button 264, start button 266 and scroll buttons 268.

The operation of the leak detector is illustrated in the truth table of FIG. 11 and taken in conjunction with the schematic of FIG. 2.

A part to be tested in mounted in the test fixture, the control system initialized and the test protocol selected. Thereafter, the test is initiated by actuating the start button 266. As a first condition, the high and low pressure lines are pressurized with the accompanying pilot valves 40, 42 in the normally open positions with the solenoids deenergized. This applies pilot pressure to the associated poppets to close and seal the high pressure and low pressure valve units 50, 52. Correspondingly, the normally closed exhaust pilot is deenergized and the exhaust valve 54 is in the open position. The normally closed isolation pilot is deenergized and the isolation valve unit 56 is in the open position.

Thereafter the high pressure pilot 40 is energized, venting the high pressure poppet whereby inlet high pressure air raises the high pressure valve unit 50 to the open position. Concurrently, the exhaust solenoid is energized admitting pilot pressure to the exhaust poppet piston chamber and shifting the exhaust valve unit 54 to the closed position and air flowing past the high pressure poppet pressurizes the exhaust chamber 144 through the distribution channel and past the isolation valve unit 56 to pressurize the test part with high pressure air. Thereafter, the isolation pilot is energized applying pilot pressure to the isolation piston chamber and closing the isolation poppet. Thereafter, the flow sensor 16 monitors pressure transients and through the microprocessor interface denotes pass or fail conditions at the indicator lights.

Upon completion of the test, the isolation pilot solenoid is deenergized pressurizing the high pressure piston and sealing the high pressure valve seat, thereby ceasing inlet flow. Concurrently, the isolation and exhaust pilot solenoids are deenergized allowing exhaust chamber and part pressure to shift the exhaust and isolation valves to the open position for completion of the test. In the event of excessive pressure lost at the test part, a light biasing spring may be provided at the isolation poppet to ensure movement to the open position.

For testing under low pressure conditions, the exhaust poppet is closed and the low pressure valving sequenced in similar fashion to the high pressure test detailed above. More particularly, a part to be tested in mounted in the test fixture, the control system initialized and the test protocol selected. Thereafter, the test is initiated by actuating the start button 266. As a first condition, the high and low pressure lines are pressurized with the accompanying pilot valves in the normally open positions with the solenoids deenergized. This applies pilot pressure to the associated poppets to close and seal the later. Correspondingly, the normally closed exhaust pilot is deenergized and the exhaust poppet is in the open position. The normally closed isolation pilot is denergized and the isolation poppet is in the open position.

Thereafter the low pressure pilot 42 is energized, venting the low pressure valve whereby inlet low pressure air raises the low pressure valve unit 52 to the open position. Concurrently, the exhaust pilot is energized admitting pilot pressure to the exhaust poppet piston chamber and shifting the exhaust valve unit 54 to the closed position and air flowing past the low pressure poppet pressurizes the exhaust chamber through the distribution channel 150 and past the isolation poppet to pressurize the test part with high pressure air. Thereafter, the isolation pilot solenoid is energized applying pilot pressure to the isolation piston chamber and closing the isolation poppet. Thereafter, the flow sensor monitors pressure transients and through the microprocessor interface denotes pass or fail conditions at the indicator. Upon completion of the test, the isolation pilot is deenergized pressurizing the low pressure piston and sealing the low pressure valve seat, thereby ceasing inlet flow. Concurrently, the isolation and exhaust pilot solenoids are deenergized allow exhaust chamber and part pressure to shift the exhaust and isolation poppets to the open position for completion of the test.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A leak detector system for determining the fluid integrity of a test component, comprising: a one-piece valve body; a first inlet port in said valve body for fluid connection with a source of pressurized fluid; an isolation port in said valve body fluidly connected with said inlet port and with the test component; an exhaust port in said valve body fluidly communicating with said isolation port and for externally discharging the pressurized fluid; an inlet valve seat in said inlet port engaged by inlet valve means in a closed position for blocking flow through said inlet port; an isolation valve seat in said isolation port engaged by isolation valve means in a closed position for blocking flow through said isolation port; an exhaust valve seat in said exhaust port engaged by exhaust valve means in a closed position for blocking flow through said exhaust port, each of said valve means comprising a separate bore in said body axially aligned with the associated valve seat, a valve member axially slidable in said bore and engagable with said valve seat in a closed position, piston means engaging said valve member for moving said valve seat to said closed position in response to a pilot pressure; and pilot control means for selectively applying said pilot pressure to said piston means in response to said control means for conducting a leakage test for determining the fluid integrity of the test component.

2. The leak detector system as recited in claim 1 wherein said pilot control means includes a microprocessor and operator interface carried by said valve body for controlling said pilot pressure and conducting said leakage test.

3. The leak detector system as recited in claim 2 wherein said microprocessor effects closure of said isolation port a predetermined time after said pressurizing.

4. The leak detector system as recited in claim 1 including a second inlet port fluidly connected to said isolation port wherein said first inlet port and said second inlet port are separately connected to fluid sources at differing pressures.

5. The leak detector system as recited in claim 1 wherein said pilot control means closes said isolation port and said outlet port after pressurizing said test component.

6. The leak detector system as recited in claim 5 including leak detecting means fluidly communicating on opposite sides of said outlet valve for determining pressure changes in said test component after said pressurizing.

7. The leak detector system as recited in claim 6 including pressure measuring means fluidly communicating on opposite sides of said outlet valve for measuring pressure conditions thereat.

8. The leak detector system as recited in claim 1 wherein said piston means is slidable in said bore independent of said valve stem.

9. A valve assembly, comprising: a unitary valve body; inlet port means formed in said valve body for fluid connection with a source of pressurized fluid; control port means formed in said valve body fluidly connected with said inlet port means and a pressure receiving component; exhaust port means formed in said valve body fluidly communicating with said control port means and for externally discharging the pressurized fluid; an inlet valve seat in said inlet port means engaged by inlet valve means in a closed position for blocking flow through said inlet port means; a control valve seat in said control port engaged by control valve means in a closed position for blocking flow through said control port means; an exhaust valve seat in said exhaust port engaged by exhaust valve means in a closed position for blocking flow through said exhaust port means, each of said valve means comprising a separate bore in said body axially aligned with associated valve seat, a valve member axially slidable in said bore and engagable with said valve seat in a closed position, and piston means engaging said valve member for moving said valve seat to said closed position in response to a pilot pressure; and pilot control means for selectively applying said pilot pressure to said piston means.

10. A leak detector system for determining the fluid integrity of a test component, comprising: a valve body; a first inlet port in said valve body for fluid connection with a source of pressurized fluid; an isolation port in said valve body fluidly connected with said inlet port and with the test component; an exhaust port in said valve body fluidly communicating with said isolation port and for externally discharging the pressurized fluid; an inlet valve seat in said inlet port engaged by inlet valve means in a closed position for blocking flow through said inlet port wherein said pressurized fluid is effective for shifting said inlet valve means to an open position in the absence of pilot pressure thereat; an isolation valve seat in said isolation port engaged by isolation valve means in a closed position for blocking flow through said isolation port; an exhaust valve seat in said exhaust port engaged by exhaust valve means in a closed position for blocking flow through said exhaust port, each of said valve means comprising a separate bore in said body axially aligned with the associated valve seat, a valve member axially slidable in said bore and engagable with said valve seat in a closed position, piston means engaging said valve member for moving said valve seat to said closed position in response to a pilot pressure; and pilot control means for selectively applying said pilot pressure to said piston means in response to said control means for conducting a leakage test for determining the fluid integrity of the test component.

11. The leak detector system as recited in claim 10, wherein said pressurizing in said test component is effective for shifting said isolation valve to said open position in the absence of pilot pressure thereat.

12. The leak detector system as recited in claim 11 including spring means for assisting movement of said isolation valve to said open position.

13. The leak detector system as recited in claim 12 including a pressure chamber communicating with said inlet valve and said isolation valve for routing said pressurized fluid therebetween.

14. The leak detector system as recited in claim 13 wherein the pressure in said pressure chamber is effective for moving said exhaust valve to an open position.

* * * * *